(12) United States Patent
De Rooij et al.

(10) Patent No.: US 10,619,667 B2
(45) Date of Patent: Apr. 14, 2020

(54) CRANKSHAFT AND MAIN BEARING ASSEMBLY FOR A RECIPROCATING PISTON INTERNAL COMBUSTION ENGINE

(71) Applicant: DAF Trucks N.V., Eindhoven (NL)

(72) Inventors: Judocus Adrianus Petronella De Rooij, Eindhoven (NL); Johanna Maria Marina Luijten, Eindhoven (NL)

(73) Assignee: DAF Trucks N.V., Eindhoven (NL)

( * ) Notice: Subject to any disclaimer, the term of this patent is extended or adjusted under 35 U.S.C. 154(b) by 309 days.

(21) Appl. No.: 15/509,983

(22) PCT Filed: Sep. 9, 2015

(86) PCT No.: PCT/NL2015/050623
§ 371 (c)(1),
(2) Date: Mar. 9, 2017

(87) PCT Pub. No.: WO2016/039624
PCT Pub. Date: Mar. 17, 2016

(65) Prior Publication Data
US 2017/0261029 A1    Sep. 14, 2017

(30) Foreign Application Priority Data

Sep. 10, 2014 (NL) ..................................... 2013448

(51) Int. Cl.
*F16C 3/14* (2006.01)
*F16C 33/10* (2006.01)

(52) U.S. Cl.
CPC ............ *F16C 3/14* (2013.01); *F16C 33/1065* (2013.01)

(58) Field of Classification Search
CPC .. F16C 7/02; F16C 7/023; F16C 7/026; F16C 7/04; F16C 7/06; F16C 7/08; F16C 9/04;
(Continued)

(56) References Cited

U.S. PATENT DOCUMENTS 1,257,258 A * 2/1918 Lemp ...................... F01M 1/06
                                                    184/6.5
5,152,373 A * 10/1992 Callies .................... F01M 1/06
                                                    123/196 R
(Continued)

FOREIGN PATENT DOCUMENTS

CN        201944103 U     8/2011
DE        19521815 A1    12/1996

OTHER PUBLICATIONS

Jan. 21, 2016—International Search Report and Written Opinion of PCT/NL2015/050623.

*Primary Examiner* — Richard W Ridley
*Assistant Examiner* — Brian J McGovern
(74) *Attorney, Agent, or Firm* — Banner & Witcoff, Ltd.

(57) ABSTRACT

A crankshaft and main bearing assembly for an internal combustion engine, includes: a crankshaft (1) with a first main bearing journal (10), a second main bearing journal (20), and one crankpin journal (110) parallel with, but radially spaced from and positioned between the first and second main bearing journals (10, 20). The first and second main bearing journals (10, 20), each have relevant first or second primary entrance openings (11, 21) in an outer surface for receiving fluid lubricant from the confronting first or second main bearing sleeves (210, 220). The one first crankpin journal (110) has a single exit opening (111) on an outer surface for supply of lubricant, in fluid communication with at least one of the primary entrance openings (11, 21). The main bearing journals (10, 20) on their outer surfaces each also have secondary entrance opening (12, 22) circumferentially spaced from the respective primary entrance openings (11, 21) and radially opposite thereto for also receiving fluid lubricant. The primary entrance opening (21) of the second main bearing journal (20) also is in an angularly spaced position with respect to the primary
(Continued)

entrance opening (11) of the first main bearing journal (10), at an angle substantially greater than 0 degrees, but substantially less than 180 degrees. The secondary entrance openings (12, 22) are also in fluid communication with the single exit opening (111) of the one crankpin journal (110), and circumferential grooves of main bearing sleeves.

12 Claims, 7 Drawing Sheets (58) Field of Classification Search
CPC ...... F16C 9/06; F16C 9/02; F16C 3/14; F16C 3/06; F16J 1/16; B64C 27/54; B64C 27/605; B64C 27/59; F04B 39/0022; F04B 39/14; F01M 2001/062; F01M 1/06
See application file for complete search history.

(56) References Cited

U.S. PATENT DOCUMENTS

| | | | |
|---|---|---|---|
| 5,163,341 A * | 11/1992 | Murrish | F16C 3/14 123/196 R |
| 2004/0103872 A1 * | 6/2004 | Ronneburger | F01M 1/06 123/196 R |
| 2010/0119182 A1 * | 5/2010 | Sugimoto | F16C 9/02 384/397 |
| 2013/0327290 A1 | 12/2013 | Gouzonnat et al. | |
| 2014/0126847 A1 | 5/2014 | Beaurepaire et al. | |
| 2015/0322889 A1 * | 11/2015 | Ni | F01M 1/06 123/197.4 |

* cited by examiner

CRANKSHAFT AND MAIN BEARING ASSEMBLY FOR A RECIPROCATING PISTON INTERNAL COMBUSTION ENGINE

CROSS-REFERENCE TO RELATED APPLICATIONS

This application is a U.S. National Stage application under 35 U.S.C. § 371 of International Application PCT/NL2015/050623 (published as WO 2016/039624 A1), filed Sep. 9, 2015, which claims the benefit of priority to NL 2013448, filed Sep. 10, 2014. Benefit of the filing date of each of these prior applications is hereby claimed. Each of these prior applications is hereby incorporated by reference in its entirety.

The present invention relates to a crankshaft and main bearing assembly for a reciprocating piston internal combustion engine and to the lubrication of bearings associated therewith. More in particular the invention relates to such a crankshaft and main bearing assembly for multi-cylinder internal combustion engines having passages arranged in the crankshaft for distributing fluid lubricant to connecting rod bearings.

In multi-cylinder reciprocating piston internal combustion engines it is common to distribute pressurized lubrication oil to connecting rod bigend bearings, i.e. crankpin journals, via one or more main bearings of the crankshaft. To this end openings are provided on the outer surface of main bearing journals, which are in communication with openings on the outer surface of one or more crankpin journals. Both main bearing journals and crankpin journals of a crankshaft are usually conceived, in use during shaft rotation, to be supported by a hydrodynamic film of lubricating oil. This usually requires adequate oil pressure and oil flow to the bearings within a lubrication circuit of an engine. A sufficient amount of oil flow and oil delivery is also important for cooling of the bearings, which in use generate heath. Often the passages in a crankshaft for distributing lubrication oil from the main bearing journals to the crankpin journals extend through the central axis of the crankshaft, which requires the oil to be forced in opposition to the centrifugal force generated by the rotating crankshaft. This effect further requires the lubrication oil pressure to be sufficiently high to counteract opposing centrifugal forces. When used for propelling vehicles in traffic, bearing loads in an internal combustion engine can vary substantially when there is switching between a fueled (fired) mode and a non-fueled (non-fired, engine braking) mode. In particular under engine braking the radial forces excerted on the main bearings of a crankshaft, especially at elevated speed conditions, can easily exceed the bearing forces present under fueled or fired operation. As a consequence an engine oil pump that meets the requirements of oil flow and pressure consumes a considerable mount of power from the engine and does not improve the energy efficiency of the engine. Moreover the need to supply lubricating oil at a sufficient rate and pressure for moments of high load has also resulted in an excess supply of oil at moments of minimal load.

It is known to provide a circumferential groove in a main bearing surface to ensure a continuous and sufficient supply of lubricating oil to crankpin journals over full rotation of a crankshaft. However such circumferential grooves reduce the available bearing surface for the main bearings. To eliminate to some extend this drawback it is also known to provide an oil passage that diametrally traverses in the main bearing journals, so that it has opposite entrance openings in the main bearing outer surface that are substantially 180° apart about the outer surface of the main bearing journal. Such a transverse passage enables the oil groove to be reduced to extend about only 180° in a circumferential direction of the inner surface of the main bearing, but with the oil flow in the transverse passage then alternating between opposite flow directions.

In multi-cylinder engines a crankshaft includes a plurality of main bearing journals in an alternating arrangement with a plurality of crankpin journals. Opposite axial ends of a crankpin journal are connected by radially extending crank arms to facing axial ends of adjacent main bearing journals. Usually when there is an even number of cylinders, the crankshaft will have an odd number of main bearings. Conversely, when the engine has an odd number of cylinders, the crankshaft will usually have an even number of main bearing journals. While in the past there could have been as little as only two main bearings to support four crankpins, it has now become common practise to provide main bearing journals aside of each crankpin.

Accordingly it is an object of the present invention to propose an improved crankshaft and main bearing assembly, which improves the effective bearing surface of the main bearings and reduces energy consumed in providing adequate lubrication of the big-end bearings. In a more general sense it is thus an object of the invention to overcome or reduce at least one of the disadvantages of the prior art. It is also an object of the present invention to provide alternative solutions which are less cumbersome in assembly and operation and which moreover can be made relatively inexpensively. Alternatively it is an object of the invention to at least provide a useful alternative.

To this end the invention provides for a crankshaft and main bearing assembly for a reciprocating piston internal combustion engine, as defined by one or more of the appended claims. As defined the additional supply of lubricating fluid from a second main bearing journal to one single crankpin exit opening, and the thereby reduced extent of circumferential bearing grooves enable a general reduction of oil flow. Main bearing in an internal combustion engine are generally the principal users of engine lubricating oil. This is because the flow of oil has to satisfy not only the lubrication requirements of the main bearings, but also the lubrication requirements of the crankpin journals fed thereby, as well as spraying oil for piston cooling and providing wristpin lubrication. The general reduction of oil flow made possible by the improved distribution of the present invention also results in a less wasteful circulation of lubrication oil. Being able to reduce the oil flow to the main bearings thus has a significant effect on oil pump losses and thereby fuel consumption. It is further possible to also reduce the size of the engine oil pump in correspondence with the reduced oil flow.

In an orbital path of the crankshaft with respect to its main bearings a reduced length of oil groove in an inner bearing surface also makes it easier to position such an oil groove outside of the highest loaded area of the main bearings. The improvement thus obtained by the invention can be employed to benefit lower fuel consumption, reduce main bearing size, increase engine life and/or allow the use of thinner engine oils. In practice it will be necessary to achieve a balance between each of these possible benefits, which is proper for the particular application of the engine. Requirements may differ whether the engine will be used in a long distance truck, in a work machine, or in a boat.

In one embodiment the crankshaft and main bearing assembly may have an arrangement according to the invention, of the first crankpin journal interposed between first and second main bearing journals, successively repeated lengthwise along the crankshaft for a multi-cylinder internal combustion engine. As long as the features of the invention are also repeated along the crankshaft the same benefits may be obtained irrespective of the number of cylinders in an engine for which the crankshaft is intended.

Whether for a single cylinder or multi-cylinder engine the crankshaft and main bearing assembly according to the invention can optionally have a transverse passage that extends between each primary and secondary entrance opening of each main bearing journal. While fluid communication to the single exit opening not extending through the central axis of the crankshaft may have advantages for the required lubricant pressure, at transverse passage through the main bearing journals may have significant advantages during manufacture of a crankshaft, which may outweigh other benefits. When use is made of a transverse passage, the transverse passages of each adjacent pair of successive transverse passages can angled with respect to each other at an angle between 30 and 150 degrees, to obtain the angularly spaced position between primary or secondary openings of the first and second main bearing journals. The angle between successive transverse passages can preferably also be between 45 and 135 degrees. In combination with such an optional embodiment an oblique lubricant passage can then extend between each transverse passage and the single exit opening of the crankpin journal following rearward of said each transverse passage. According to a further optional embodiment a further oblique lubricant passage can then also extend between each transverse passage and the single exit opening of the crankpin journal preceding forward of said each transverse passage. The oblique lubricant passage can thereby extends from the transverse passage at a first junction and the further oblique lubricant passage can extend from the transverse passage at a second junction. The second junction can optionally be spaced from the first junction. Spacing of the first and second junctions allows the oblique passages to be optimally arranged in the crank arms, and gives more freedom in positioning the transverse passages at a desired angular orientation.

According to yet another optional embodiment the main bearing sleeves can all be fed with lubricating fluid from a common main gallery. The main bearing sleeves can all have a lubricant groove in an inner circumferential surface, which groove extends over less than 180 degrees of the inner circumference. More preferably the groove extends over less than 135 degrees, and most preferably over about 120 degrees of the inner circumference. In combination therewith each main bearing sleeve is divided in an upper and a lower bearing shell, and wherein the groove has a first part in the upper bearing shell and a second part in the lower bearing shell. The oil groove apart from being shorter, can now also be kept away from the highest loaded area of the bearing surface.

Further advantageous aspects of the invention will become clear from the appended description and in reference to the accompanying drawings, in which.

Figure 1A:
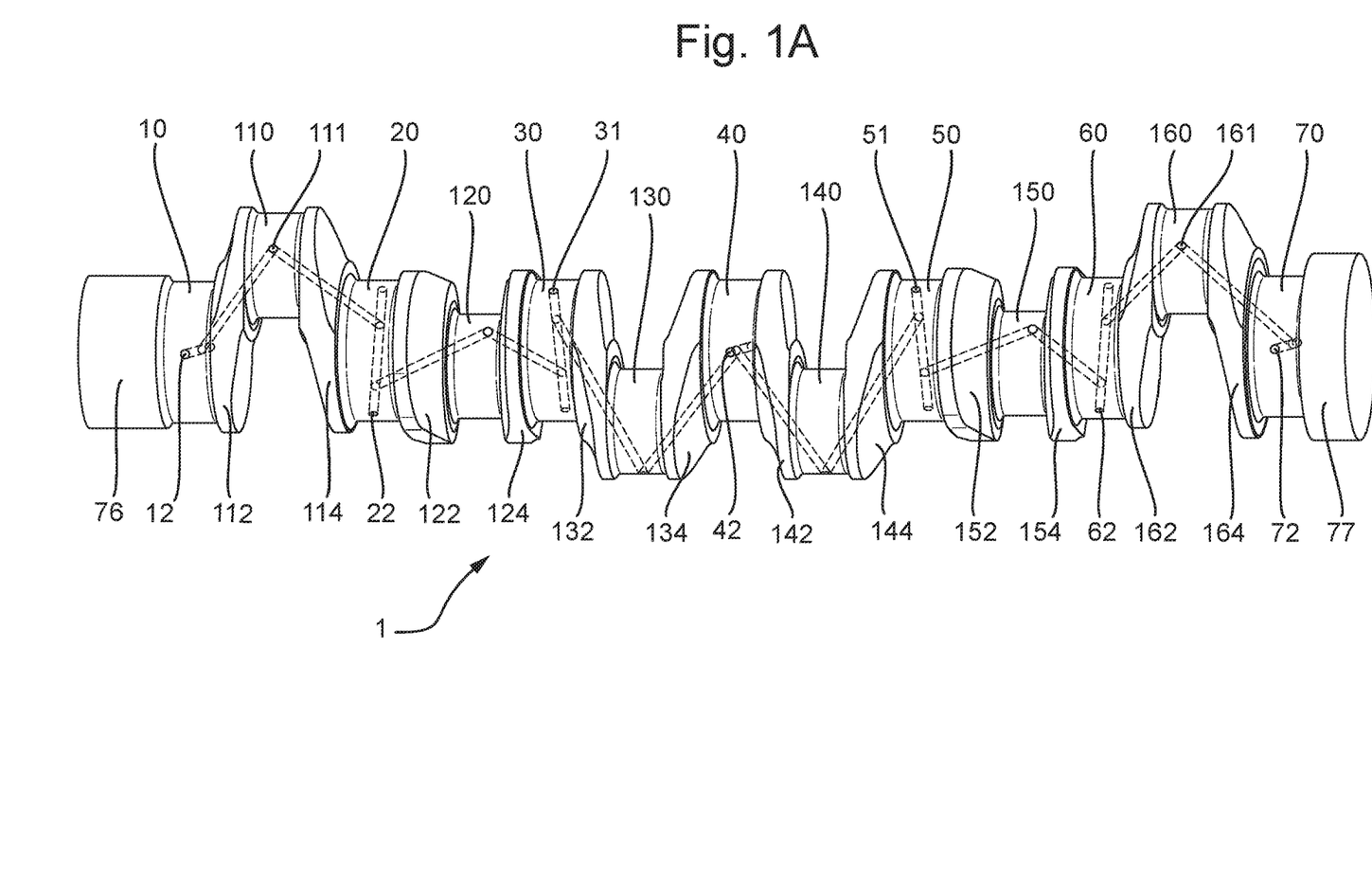
FIG. 1A shows a crankshaft for a six cylinder engine.

Referring now to FIG. 1A a crankshaft 1 is shown that has first, second, third, fourth, fifth, sixth and seventh main bearing journals 10, 20, 30, 40, 50, 60, 70. Interposed between these main bearing journals are first, second, third, fourth, fifth, and sixth crankpin journals 110, 120, 130, 140, 150, 160 for each receiving a big end of a respective connecting rod in a six cylinder engine (now shown, but conventional). The crankpin journals or crankpins 110, 120, 130, 140, 150, 160 are each radially spaced from the crankshaft center line by first to sixth pairs of first and second crank arms 112, 114; 122, 124; 132, 134; 142, 144; 152, 154; 162, 164. The successive pairs of first and second crank arms are phased at 120 degrees angular intervals, as is conventional in six cylinder engines. A front end of the crankshaft 1 is provided with a boss 76, which can serve in driving ancillaries or auxiliaries, such as camshafts, fuel pumps, water pumps, compressors, generators, or the like. A rear end of the crankshaft 1 is provided with a flange 77 for mounting of a fly wheel (not shown, but conventional).

The main bearing journals 10, 20, 30, 40, 50, 60, 70 of the crankshaft 1 are axially spaced and aligned with one another along the center line of the crankshaft. Each crankpin journal 110, 120, 130, 140, 150, 160 is parallel to the crankshaft center line, but radially spaced therefrom by the respective pairs of first and second crankshaft arms. The arrangement is substantially repetitive in a multi-cylinder reciprocating piston engine, such as a 6-cylinder in-line engine of which crankshaft 1 is an example. Representative is that the crankshaft 1 comprises a first main bearing journal 10, a second main bearing journal 20 that is axially aligned with and spaced from the first main bearing journal 10, and at least a first crankpin journal 110, which is parallel with and radially spaced from the first and second main bearing journals 10, 20. The at least first crankpin journal 110 is thereby interposed between first and second radially extending crank arms 112, 114 that are each associated with one of the first and second main bearing journals 10, 20. This arrangement with respect to the first and second main bearing journals 10, 20 and first crankpin journal 110 is also valid for each of the second and third main bearing journals and second crankpin journal 120, and so on until the sixth crankpin journal 160, interposed between the sixth and seventh main bearing journals 60, 70.

Figure 1B:
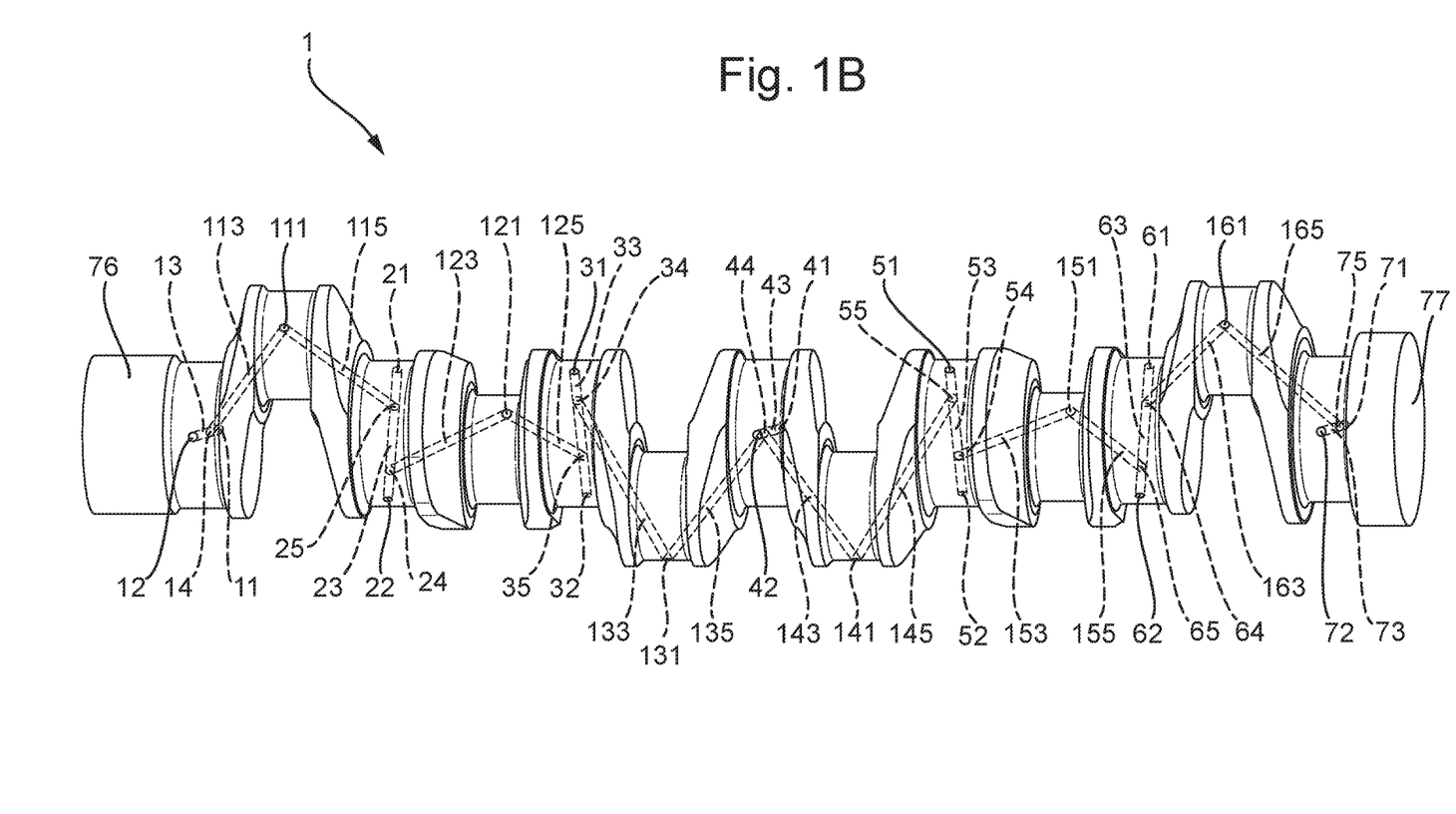
FIG. 1B is an illustration similar to FIG. 1A, but now indicating the various lubrication passages.

For distribution of lubrication oil through the crankshaft the main bearing journals are each provided with primary and secondary entrance openings such as indicated at 12, 22, 31, 42, 51, 62, 72 in FIG. 1A and further in FIG. 1B. The lubrication oil distributed through the crankshaft 1 exits from the crankpin journals through exit openings as indicated at 111 and 161. For a further description of the oil distribution through the crankshaft 1, reference will be made to FIG. 1B.

The crankshaft 1 with its front end boss 76 and rear end flange 77 in FIG. 1B is illustrated in exactly the same position as in FIG. 1A, but differs in that references to the main bearing and crankpin bearing journals are deleted for clarity. The distribution of lubrication oil from the main bearing journals to the crankpin journals is ensured by an arrangement of passages extending through the crankshaft 1 and are individually referenced in FIG. 1B. Each of the first to seventh main bearing journals 10, 20, 30, 40, 50, 60, 70 defines an outer circumferential surface into each of which a relevant first to seventh primary entrance opening 11, 21, 31, 41, 51, 61, 71 opens. Each of the first to seventh primary entrance openings 11, 21, 31, 41, 51, 61, 71 opens into a respective one of first to seventh transverse passages 13, 23, 33, 43, 53, 63, 73.

Each of the seven transverse passages 13, 23, 33, 43, 53, 63, 73 connects to a respective one of seven secondary entrance openings 12, 22, 32, 42, 52, 62, 72 that is circumferentially spaced about the outer circumferential surface of the respective main bearing journal with respect to the relevant primary entrance opening to be substantially radially opposite thereto.

The first to sixth transverse passages 13, 23, 33, 43, 53, 63 are in fluid connection with adjacent oblique oil passages 113, 123, 133, 143, 153, 163 leading to first to sixth single exit openings 111, 121, 131, 141, 151, 161 in the first to sixth crankpin journals 110, 120, 130, 140, 150, 160.

A first oblique oil passage 113 extends between a first junction 14 in the first transverse passage 13 to the first single exit opening 111 of the first crankpin journal 110. In a similar fashion a second oblique oil passage 123 extends between a first junction 24 in the second transverse passage 23 to the second single exit opening 121 in the second crankpin journal 120. This arrangement is repeated for all of the first to sixth main bearing journals 10, 20, 30, 40, 50, 60, and the first to sixth crankpin journals 110, 120, 130, 140, 150, 160. As seen in FIG. 1B the remaining third, fourth, fifth and sixth transverse passages 33, 43, 53, 63 all connect to a relevant third, fourth, fifth and sixth oblique oil passage 133, 143, 153, 163 connecting between a first junction 34, 44, 54, 64 and the relevant third to sixth single exit openings 131, 141, 151, 161. Thereby a supply of lubricating oil is ensured from one main bearing journal to one adjacent crankpin journal.

As further seem in FIGS. 1A and 1B, an additional oblique oil passage 115 extends between a second junction 25 in the second transverse passage 23 to the first single exit opening 111 in the first crankpin journal 110. In again a similar fashion an additional oblique oil passage 125 also extends between a second junction 35 in the third transverse passage 33 and the second single exit opening 121 of the second crankpin journal 120. This pattern of addition oblique oil passages 115, 125, 135, 145, 155, 165 is repeated for the remainder of the fourth to seventh transverse passages 43, 53, 63, 73 and the third to sixth single exit openings 131, 141, 151, 161 of the third to sixth crankpin journals 130, 140, 150, 160.

In this regard it will also be understood that the first main bearing journal 10 only has a first junction 14 in its first transverse passage 13, and the seventh and last main bearing journal 70 only needs to have a second junction 75 in the seventh transverse passage 73.

Figure 2:
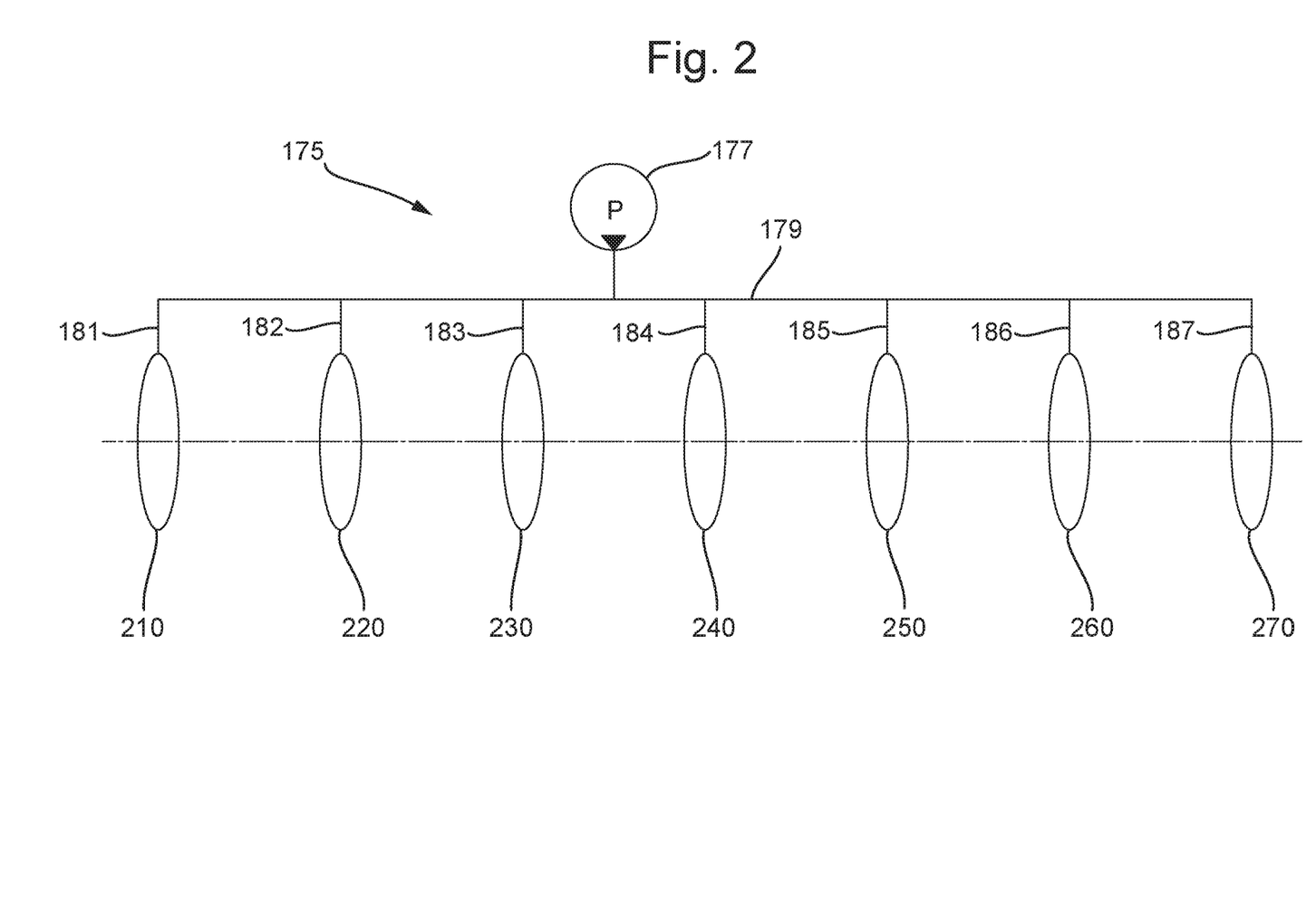
FIG. 2 is a schematic representation of main bearings and associated lubrication circuit for the crankshaft of FIGS. 1A and 1B.

As schematically illustrated in FIG. 2, each of the first to seventh main bearing journals 10, 20, 30, 40, 50, 60, 70 of the crankshaft 1, in use will be received in a confronting one of first to seventh main bearing sleeves 210, 220, 230, 240, 250, 260, 270 of a main bearing lubrication circuit 175. This main bearing lubrication circuit 175, as schematically illustrated in FIG. 2, also includes an engine oil pump 177, which feeds into a main oil gallery 179. The main oil gallery 179 is branched off into first to seventh oil feed connecting conduits 181, 182, 183, 184, 185, 186, 187 each leading to one of the first to seventh main bearing sleeves 210, 220, 230, 240, 250, 260, 270. For a more detailed description of the individual main bearing sleeves reference will be made to FIG. 5.

Figure 3:
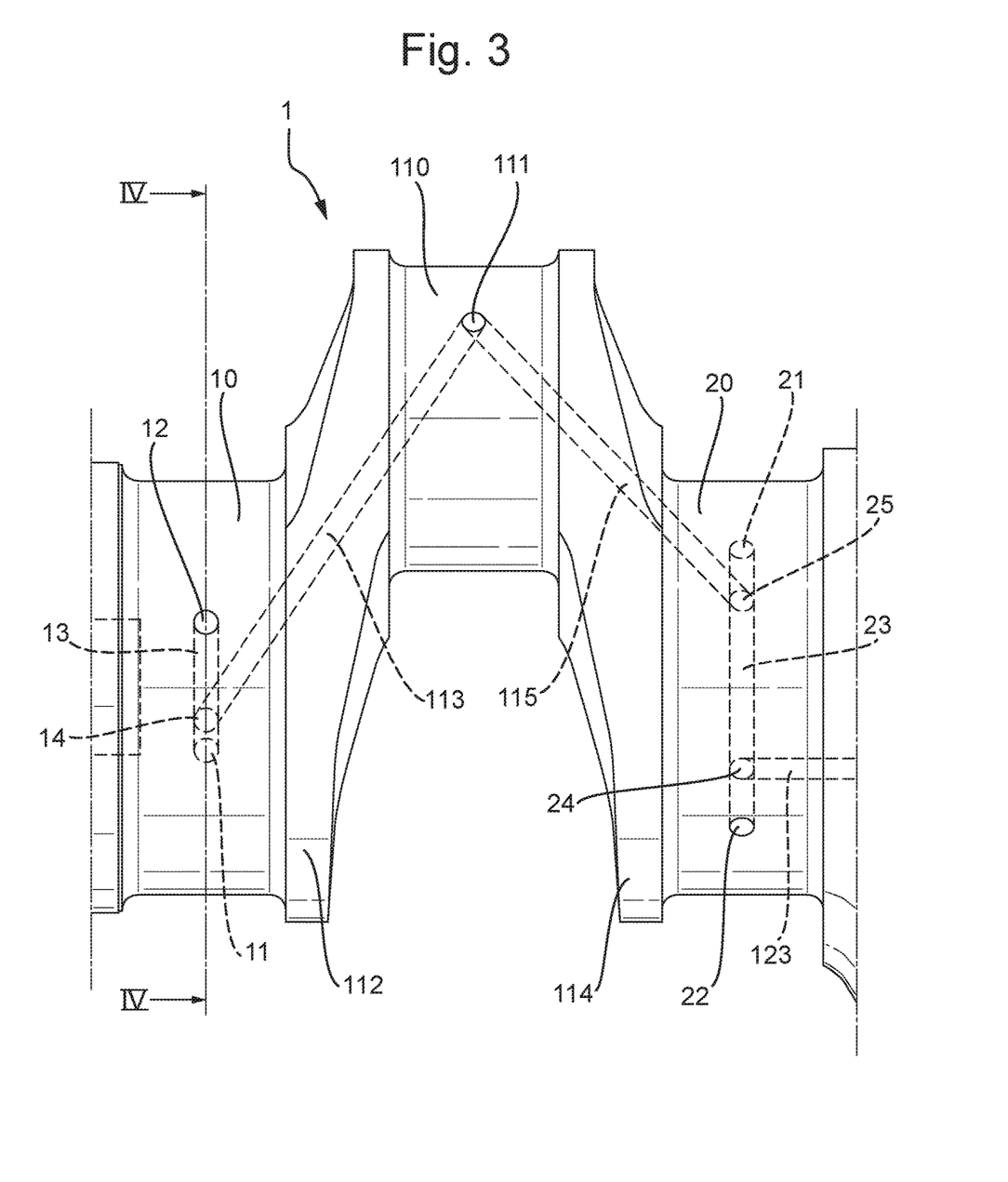
FIG. 3 is a partial longitudinal elevation of a crankshaft as in FIGS. 1A and 1B, showing the arrangement of a crankpin journal between adjacent main bearing journals.
Figure 4:
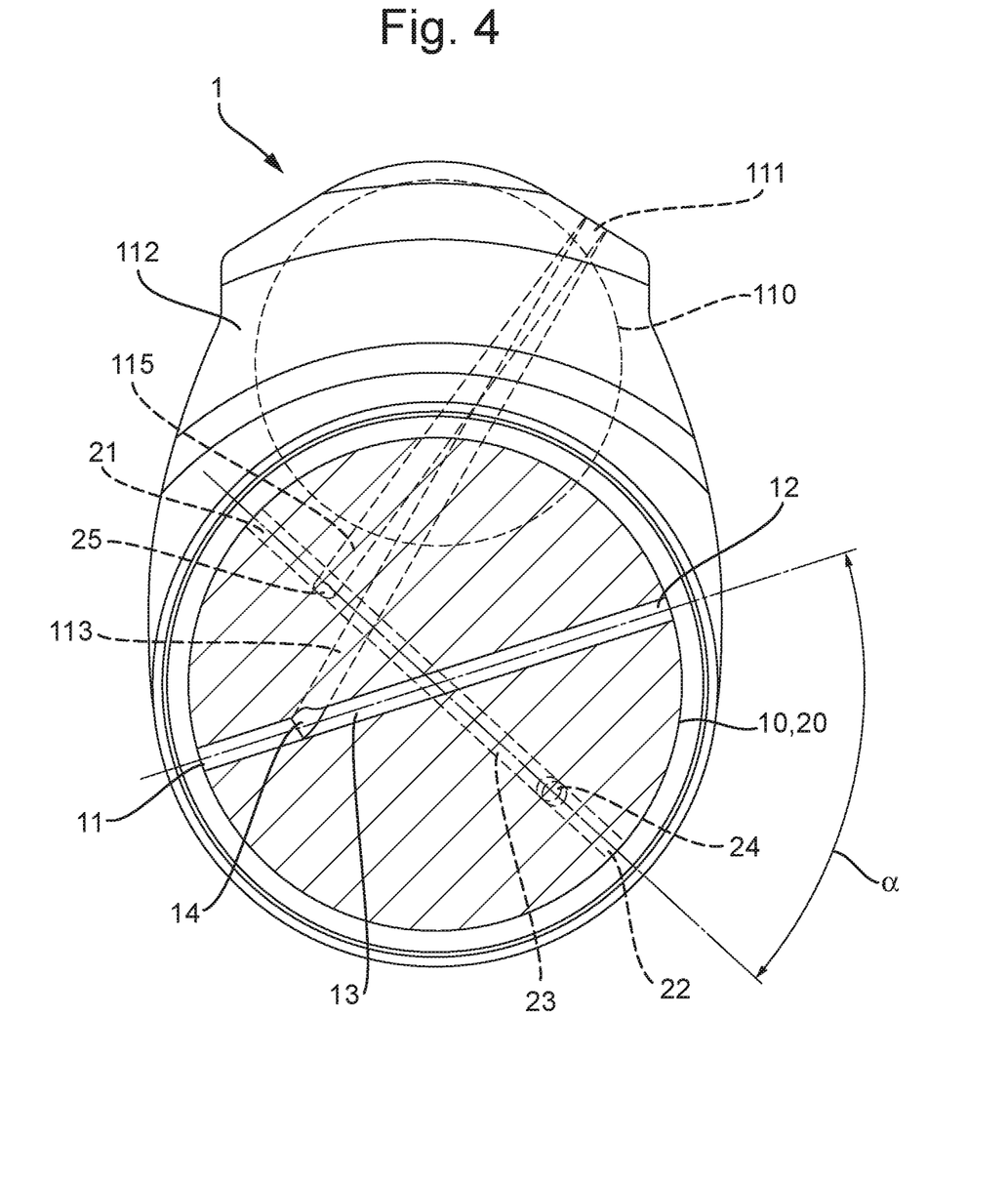
FIG. 4 is a cross sectional view across the line IV-IV in FIG. 3.

First reference will now be made to FIGS. 3 and 4, in which FIG. 3 is a partial longitudinal elevation of the crankshaft 1 showing in greater detail the first and second main bearing journals 10, 20 with the first crankpin journal 110. FIG. 4 is a cross sectional view taken along the line IV-IV and in the direction of the arrows associated therewith. While only the first and second main bearing journal 10, 20 and first crankpin journal 110 are shown in FIGS. 3 and 4, the explanation given below is also relevant for the third to seventh main bearing journals 30, 40, 50, 60, 70 in respect of feeding oil to the second to sixth crankpin journals 120, 130, 140, 150, 160.

As seen in FIG. 3 the first primary and secondary entrance openings 11, 12 of the first main bearing journal 10 are in fluid connection with the first single exit opening 111 of the first crankpin journal 110 via the first transverse passage 13, first junction 14 and the first oblique oil passage 113. The first oblique oil passage thereby extends through the first crank arm 112. The second primary and secondary openings 21, 22 of the second main bearing journal 20 are in fluid connection with the second crankpin journal 120 (not visible in FIG. 3, but shown in FIGS. 1A and 1B) via the first junction 24 and the second oblique oil passage 123. It is clearly apparent from FIGS. 3 and 4 that the first primary and secondary entrance openings 11, 12 and the second primary and secondary entrance openings 21, 22 are in an angularly rotated position with respect to one another. To make a more optimal use of this angularly rotated position, the additional oblique oil passage 115 extends from the second junction 25 in the second transverse passage 23 to also the first single exit opening 111 in the first crankpin journal 110. This additional oblique passage 115 extends through the second crank arm 114. The angularly spaced position of the second primary and secondary entrance openings 21, 22 with respect to the first primary and secondary entrance openings 11, 12, as shown in FIG. 3 is associated with an angle α between the first and second transverse passages 13, 23. The angle α between successive transverse passages in practice will be dictated to some extent by the angular position of the successive pairs of first and second crank arms associated with the successive crankpin journals. Nonetheless it will usually be possible in engines having between three and eight cylinders to select the angle α between successive transverse passages such as 13, 23, to be between 30 and 150 degrees, and preferably between 45 and 135 degrees. As a result the distance in crank angle between one of the first primary or secondary entrance openings 11, 12 and one of the second primary or secondary entrance openings 21, 22 will never have to exceed 150 degrees.

Figure 5:
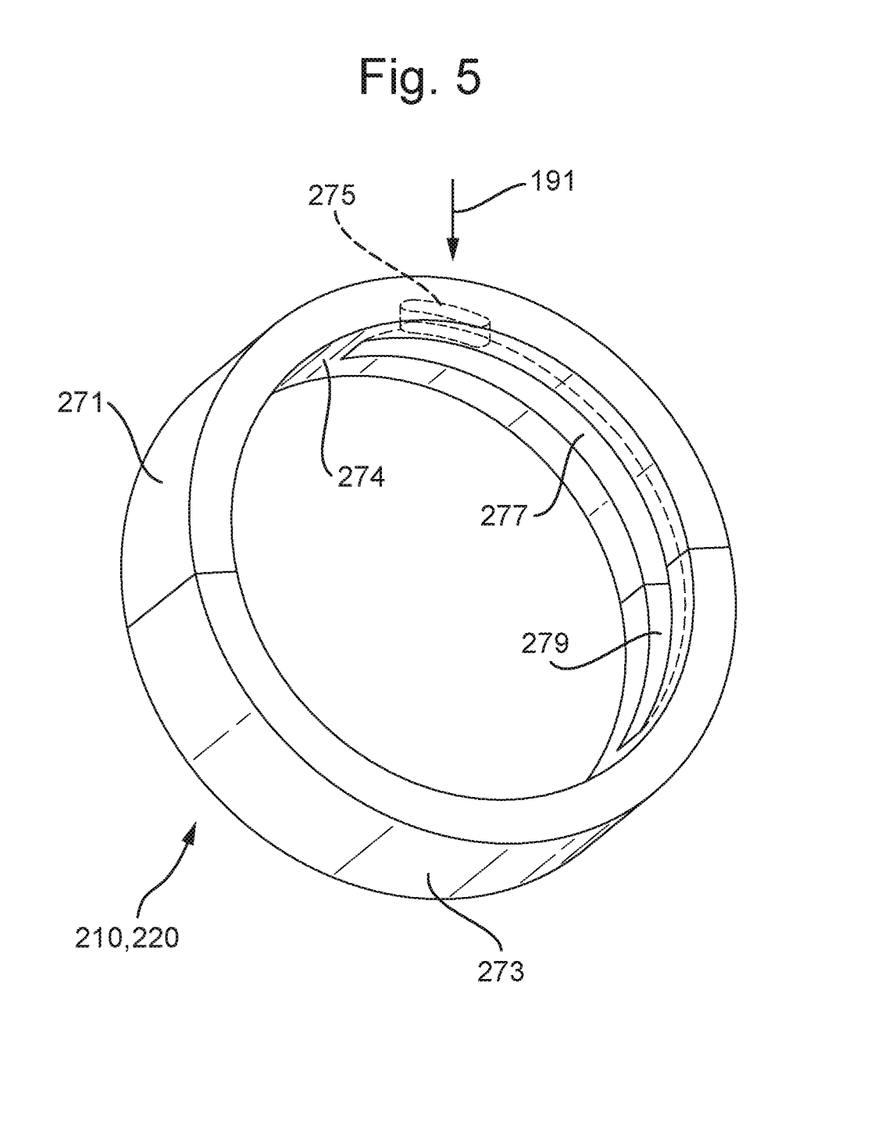
FIG. 5 is a perspective view of a main bearing sleeve formed of upper and lower half-shells of the present invention.

As will now be seen in reference to FIG. 5, each bearing sleeve, such as the first and second bearing sleeves 210, 220 for the first and second main bearing journals 10, 20, is formed from separate upper and lower bearing shells 271, 273. The assembled upper and lower bearing shells 271, 273 of the main bearing sleeves 210, 220, 230, 240, 250, 260, 270 as indicated schematically in FIG. 2, each define an inner bearing surface 274 as shown in FIG. 5. The inner bearing surface 274 snuggly surrounds the relevant outer circumferential surface of the respective main bearing journal to allow a hydrodynamic film of lubrication oil to be formed and maintained therebetween. To allow engine oil to enter between the bearing sleeve and main bearing journal, an oil supply opening 275 is arranged in the upper bearing shell 271 to communicate with a relevant one of the first to seventh connecting conduits 181, 182, 183, 184, 185, 186, 187 of the main oil gallery 179. Lubricating oil will thereby be enabled to flow in the direction of arrow 191 under the pressure generated by the engine oil pump 177, as shown in FIG. 2. It is further shown in FIG. 5 that an oil groove extends with a first part 277 in the upper bearing shell 271, and with a second part 279 in the lower bearing shell 273.

This oil groove 277, 279 helps to ensure a sufficient and direct flow of lubrication oil from the supply opening 275 to the primary and secondary supply openings of the rotating crankshaft, such as the primary and secondary entrance openings 11, 12, 21, 22 as shown in FIGS. 3 and 4. As a result of the alternating oil flow to the single crankpin outflow opening from each of two adjacent main bearing journals, as explained in reference to FIGS. 3 and 4, the oil groove 277, 279 need only to extend at the most over a circumferential angle of substantially less than 180 degrees, preferably over only less than 150 degrees, and most preferably over an angle of less than 135 degrees, such as about 120 degrees. This angle, in part, is also dependent on the number of crankpin journals of the crankshaft, and the number cylinders in the engine for which the crankshaft is intended. As a result of this reduced circumferential extent of the oil groove 277, 279, the inner bearing surface 274 can retain an uninterrupted full wide supporting surface over a greater circumferential extent than was possible with the prior art. At the same time it has also become possible to eliminate interference of the oil groove 277, 279 with areas of the bearing circumference where the highest radial loads occur.

Figure 6A:
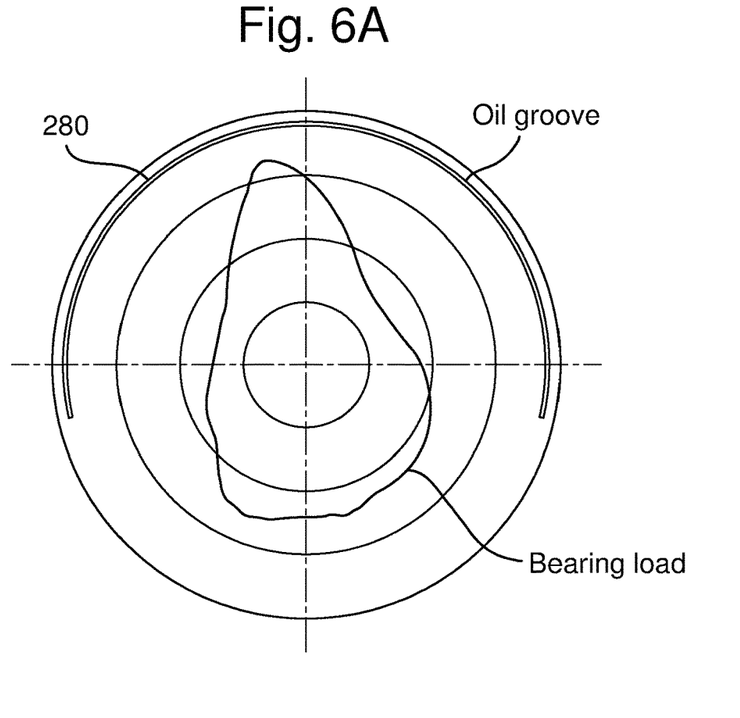
FIG. 6A is a diagram of an orbital crankshaft path showing a typical radial bearing load under engine braking in relation to a prior art bearing oil groove.
Figure 6B:
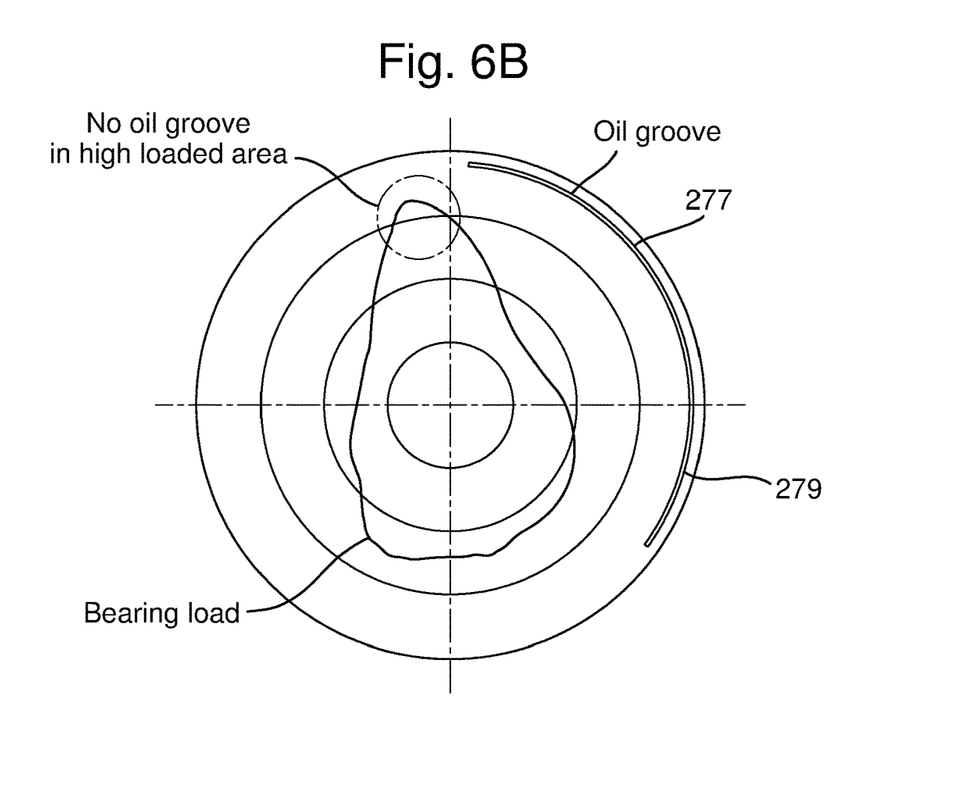
FIG. 6B is a diagram similar to the orbital crankshaft path of FIG. 6A, but now showing the circumferential extent and position of a bearing oil groove made possible in the present invention.

This advantageous effect may be more fully appreciated from a comparison between the FIGS. 6A and 6B. Both of FIGS. 6A and 6B in a diagram show the bearing load during engine braking at an elevated engine speed in an orbital path of the crankshaft for the prior art (FIG. 6A), and for the present invention (FIG. 6B). As indicated in the diagram of FIG. 6A the highest bearing load occurs slightly before top dead centre and in a location where the oil groove 280 would conventionally be located. As shown in the diagram of FIG. 6B the oil groove 277, 279 has been reduced and repositioned to an extent that it does no longer interfere with the highest load bearing area under engine braking at an elevated engine speed.

As described herein a crankshaft and main bearing assembly for a reciprocating piston internal combustion engine, the assembly thus includes: a crankshaft 1 that has a first main bearing journal 10, a second main bearing journal 20 axially aligned with and spaced from the first main bearing journal 10, and at least a first crankpin journal 110 parallel with, but radially spaced from the first and second main bearing journals 10, 20. The at least first crankpin journal 110 is interposed between a first radially extending crank arm 112 associated with the first main bearing journal 10 and a second radially extending crank arm 114 associated with the second main bearing journal 20. A first main bearing sleeve 210 receiving the first main bearing journal 10, has a circumferential groove 277, 279 in an inner bearing surface 274 thereof to supply fluid lubricant to the first bearing journal 10; and a second main bearing sleeve 220 receiving the second main bearing journal 20 has a circumferential groove 277, 279 in an inner bearing surface 274 thereof to supply fluid lubricant to the second bearing journal 220. The first main bearing journal 10 defines an outer circumferential surface with a first primary entrance opening 11 therein for receiving fluid lubricant from the circumferential groove 277, 279 of the first main bearing sleeve 210. Similarly the second main bearing journal 20 defines an outer circumferential surface with a second primary entrance opening 21 therein for receiving fluid lubricant from the circumferential groove 277, 279 of the second main bearing sleeve 220. The at least first crankpin journal 110 defines on outer circumferential surface with a single exit opening 111 therein to supply fluid lubricant to the at least first crankpin journal 110, and at least one of the first and second primary entrance openings 11, 21 is in fluid communication with the single exit opening 111 of the at least first crankpin journal 110. The first main bearing journal 10 on its outer circumferential surface has a first secondary entrance opening 12 circumferentially spaced from the first primary entrance opening 11 to be substantially radially opposite thereto for also receiving fluid lubricant from the circumferential groove, and the second main bearing journal 20 on its outer circumferential surface has a second secondary entrance opening 22 circumferentially spaced from the second primary entrance opening 21 to be substantially radially opposite thereto for also receiving fluid lubricant from the circumferential groove. The second primary entrance opening 21 of the second main bearing journal 20 is in an angularly spaced position with respect to the first primary entrance opening 11 of the first main bearing journal 10, which angularly spaced position is oriented at an angle substantially greater than 0 degrees, but substantially less than 180 degrees from the first primary entrance opening 11. The first secondary and second secondary entrance openings 12, 22 are also in fluid communication with the single exit opening 111 of the at least first crankpin journal 110, and the circumferential grooves 277, 279 of the first and second main bearing sleeves 210, 220 each extend over substantially less than 180 degrees of the respective inner surface 274.

Conventionally in a multiple cylinder engine, every crankpin journal is supplied with lubricating oil through one main bearing journal. A main bearing journal transverse oil passage (similar to 13) extends between primary entrance opening (similar to 11) and secondary entrance opening (similar to 12). An oblique oil passage (similar to 113) extends from a first junction (similar to 14) to a single exit opening (similar to 111) in a crankpin. An oil groove (such as 180 in FIG. 6A) present substantially only in the upper main bearing shell is fed by the main oil gallery (similar to 179). The lubricating oil initially flows from first primary entrance opening (such as 11) to the first junction (such as 14), and from there to the single exit opening (such as 111). After 180° crankshaft rotation the oil flow direction changes and starts at the secondary entrance opening (such as 12), from where it goes via the first junction (such as 14) to the single exit opening (such as 111) in the crankpin journal.

For each subsequent cylinder in an in-line straight six engine the transverse oil passages (such as 13, 23) are angled 120° with respect to each other. By the addition, according to the present invention, of an additional oblique oil passage 115 between a second junction 24 in the second transverse passage 23, and the single exit opening 111, the oil flow can now also change in-between from the second primary entrance 21 via the second junction 24 to the single exit opening 111, and from the second secondary entrance 22 via the second junction to the single exit opening 111. As a consequence the oil groove necessary in the bearing can then be reduced to less than 180°, and preferably to about 120°. As a result of this shorter circumferential oil groove the required oil flow through the main bearing can be substantially reduced. A reduction of over 30% is thereby attainable.

As the oil groove is always located in the upper bearing region, where also the maximum mass force is, the oil groove can now be kept away from this area so that an optimal bearing surface is available in this area. By relocating the oil groove 277, 279, and by dividing the groove between upper and lower bearing shells 271, 273, the groove can be confined to a lower loaded area of the main bearing. The maximum allowable mass force (under engine braking at high engine speeds) can then be increased without having a too low oil film thickness or too high bearing load for the available bearing surface.

It is thus believed that the operation and construction of the present invention will be apparent from the foregoing description and drawings appended thereto. For the purpose of clarity and a concise description features are described herein as part of the same or separate embodiments, however, it will be appreciated that the scope of the invention may include embodiments having combinations of all or some of the features described. It will be clear to the skilled person that the invention is not limited to any embodiment herein described and that modifications are possible which may be considered within the scope of the appended claims. Also kinematic inversions are considered inherently disclosed and can be within the scope of the invention. In the claims, any reference signs shall not be construed as limiting the claim. The terms 'comprising' and 'including' when used in this description or the appended claims should not be construed in an exclusive or exhaustive sense but rather in an inclusive sense. Thus expression as 'including' or 'comprising' as used herein does not exclude the presence of other elements, additional structure or additional acts or steps in addition to those listed. Furthermore, the words 'a' and 'an' shall not be construed as limited to 'only one', but instead are used to mean 'at least one', and do not exclude a plurality. Features that are not specifically or explicitly described or claimed may additionally be included in the structure of the invention without departing from its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. To the extend that structure, material, or acts are considered to be essential they are inexpressively indicated as such. Additions, deletions, and modifications within the purview of the skilled person may generally be made without departing from the scope of the invention, as determined by the claims.

The invention claimed is:

1. Crankshaft and main bearing assembly for a reciprocating piston internal combustion engine, the crankshaft and main bearing assembly including:
    a crankshaft having a first main bearing journal, a second main bearing journal axially aligned with and spaced from said first main bearing journal, and a first crankpin journal positioned between the first main bearing journal and the second main bearing journal, but radially spaced from the first and second main bearing journals, the first crankpin journal being interposed between a first pair of radially extending crank arms associated, respectively, with the first main bearing journal and the second main bearing journal;
    a first main bearing sleeve receiving the first main bearing journal, the first main bearing sleeve having a circumferential groove to supply fluid lubricant to the first main bearing journal; and
    a second main bearing sleeve receiving the second main bearing journal, the second main bearing sleeve having a circumferential groove to supply fluid lubricant to the second main bearing journal,
    wherein the first main bearing journal defines an outer circumferential surface with a first primary entrance opening therein for receiving fluid lubricant from the circumferential groove of the first main bearing sleeve,
    wherein the second main bearing journal defines an outer circumferential surface with a second primary entrance opening therein for receiving fluid lubricant from the circumferential groove of the second main bearing sleeve,
    wherein the first crankpin journal defines an outer circumferential surface with a single exit opening therein to supply fluid lubricant to the first crankpin journal,
    wherein at least one of the first and second primary entrance openings is in fluid communication with the single exit opening of the first crankpin journal,
    wherein the outer circumferential surface of the first main bearing journal has a first secondary entrance opening circumferentially spaced from the first primary entrance opening to be substantially radially opposite thereto for also receiving fluid lubricant from the circumferential groove of the first main bearing sleeve,
    wherein the outer circumferential surface of the second main bearing journal has a second secondary entrance opening circumferentially spaced from the second primary entrance opening to be substantially radially opposite thereto for also receiving fluid lubricant from the circumferential groove of the second main bearing sleeve,
    wherein a total number of main bearing sleeves, including said first and said second main bearing sleeves, are all fed with the fluid lubricant from a common main gallery, each main bearing sleeve is formed from a respective upper bearing shell and a respective lower bearing shell, the respective lower bearing shell being separate from the upper bearing shell, each main bearing sleeve including a respective circumferential groove having a respective first part in the respective upper bearing shell and a respective second part in the respective lower bearing shell, each main bearing sleeve having a respective inner bearing surface and the respective circumferential groove extends over less than 150 degrees of the respective inner bearing surface,
    wherein the second primary entrance opening of the second main bearing journal is in an angularly spaced position with respect to the first primary entrance opening of the first main bearing journal, which angularly spaced position is oriented at an angle substantially greater than 0 degrees, but substantially less than 180 degrees from the first primary entrance opening,
    wherein the first secondary and second secondary entrance openings are in fluid communication with the single exit opening of the first crankpin journal.

2. Crankshaft and main bearing assembly according to claim 1, further comprising at least one of:
    (i) a second crankpin journal positioned between the second main bearing journal and a third main bearing journal, said third main bearing journal axially aligned with and spaced from said second main bearing journal, said second crankpin journal being radially spaced from the second and third main bearing journals, the second crankpin journal being interposed between a second pair of radially extending crank arms associated respectively with the second main bearing journal and the third main bearing journal;

(ii) a third crankpin journal positioned between the third main bearing journal and a fourth main bearing journal, said fourth main bearing journal axially aligned with and spaced from said third main bearing journal, said third crankpin journal being radially spaced from the third and fourth main bearing journals, the third crankpin journal being interposed between a third pair of radially extending crank arms associated respectively with the third main bearing journal and the fourth main bearing journal;

(iii) a fourth crankpin journal positioned between the fourth main bearing journal and a fifth main bearing journal, said fifth main bearing journal axially aligned with and spaced from said fourth main bearing journal, said fourth crankpin journal being radially spaced from the fourth and fifth main bearing journals, the fourth crankpin journal being interposed between a fourth pair of radially extending crank anus associated respectively with the fourth main bearing journal and the fifth main bearing journal;

(iv) a fifth crankpin journal positioned between the fifth main bearing journal and a sixth main bearing journal, said sixth main bearing journal axially aligned with and spaced from said fifth main bearing journal, said fifth crankpin journal being radially spaced from the fifth and sixth main bearing journals, the fifth crankpin journal being interposed between a fifth pair of radially extending crank arms associated respectively with the fifth main bearing journal and the sixth main bearing journal;

(v) a sixth crankpin journal positioned between the sixth main bearing journal and a seventh main bearing journal, said seventh main bearing journal axially aligned with and spaced from said sixth main bearing journal, said sixth crankpin journal being radially spaced from the sixth main bearing journal and the seventh main bearing journal, the sixth crankpin journal being interposed between a sixth pair of radially extending crank arms associated respectively with the sixth main bearing journal and the seventh main bearing journal.

3. Crankshaft and main bearing assembly according to claim 1, wherein a first transverse passage extends between the first primary entrance opening and the first secondary entrance opening of the first main bearing journal, and wherein a second transverse passage extends between the second primary entrance opening and the second secondary entrance opening of the second main bearing journal.

4. Crankshaft and main bearing assembly according to claim 3, wherein the first transverse passage and the second transverse passage are angled with respect to each other at an angle between 30 and 150 degrees.

5. Crankshaft and main bearing assembly according to claim 4, wherein the angle between the first and second transverse passages is between 45 and 135 degrees.

6. Crankshaft and main bearing assembly according to claim 3, wherein a first oblique lubricant passage extends between the first transverse passage and the single exit opening of the first crankpin journal.

7. Crankshaft and main bearing assembly according to claim 6, wherein an additional oblique lubricant passage extends between the second transverse passage and the single exit opening of the first crankpin journal.

8. Crankshaft and main bearing assembly according to claim 7, wherein a second oblique lubricant passage extends between the second transverse passage and a single exit opening of a second crankpin journal, wherein the second oblique lubricant passage extends from a first junction of the second transverse passage that is spaced from a second junction of the second transverse passage.

9. Crankshaft and main bearing assembly according to claim 8, wherein the additional oblique lubricant passage extends from the second transverse passage at the second junction of the second transverse passage.

10. Crankshaft and main bearing assembly according to claim 6, wherein the first oblique lubricant passage extends from the first transverse passage at a first junction of the first transverse passage.

11. Crankshaft and main bearing assembly according to claim 1, wherein for each main bearing sleeve the respective circumferential groove extends over less than 135 degrees of the respective inner bearing surface.

12. Crankshaft and main bearing assembly according to claim 11, wherein for each main bearing sleeve the respective circumferential groove extends over about 120 degrees of the respective inner bearing surface.

* * * * *